Dec. 27, 1955  F. J. STURMA  2,728,325
WATER HEATING APPARATUS FOR WATERING TROUGHS
Filed Jan. 26, 1953  3 Sheets-Sheet 1
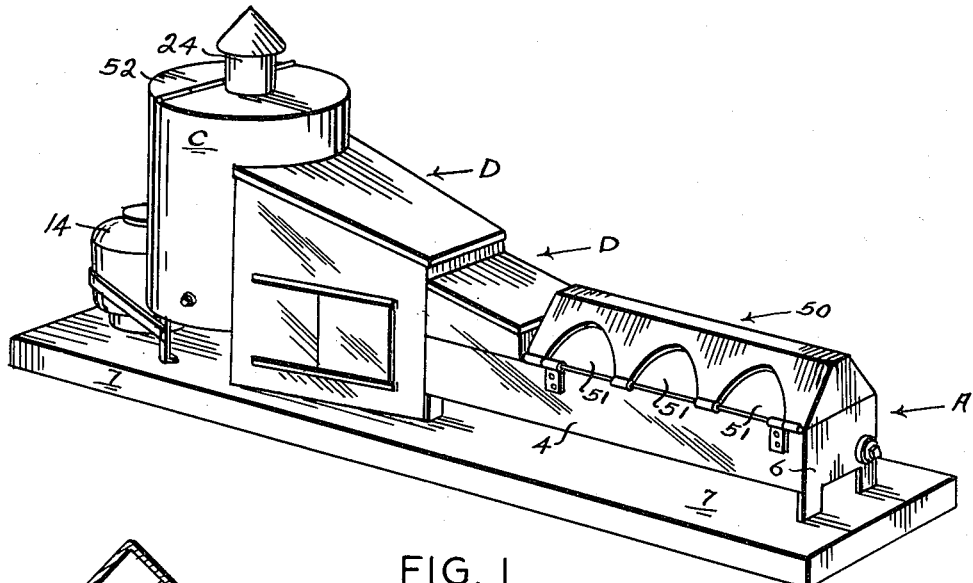
FIG. 1
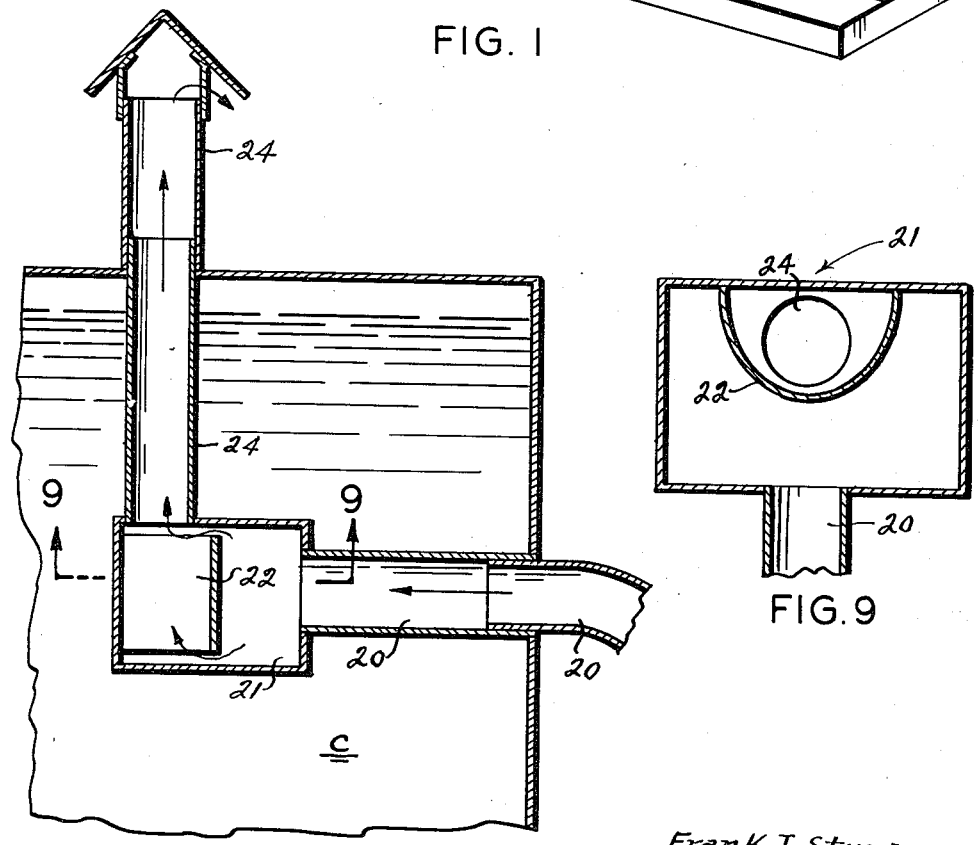
FIG. 8
FIG. 9
Frank J. Sturma
INVENTOR,
BY
Bernard P. Miller
ATTORNEY Dec. 27, 1955  F. J. STURMA  2,728,325
WATER HEATING APPARATUS FOR WATERING TROUGHS
Filed Jan. 26, 1953  3 Sheets-Sheet 2

Frank J. Sturma
INVENTOR,

BY
Bernard P. Miller
ATTORNEY

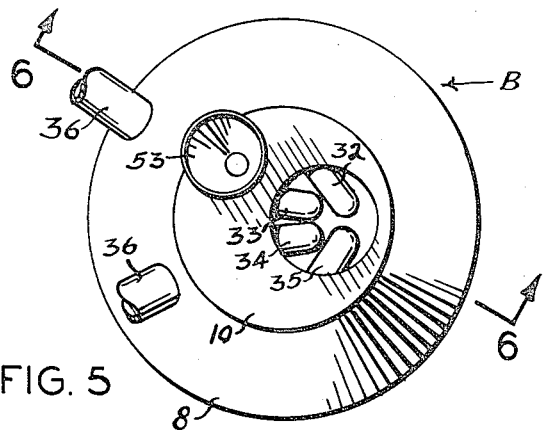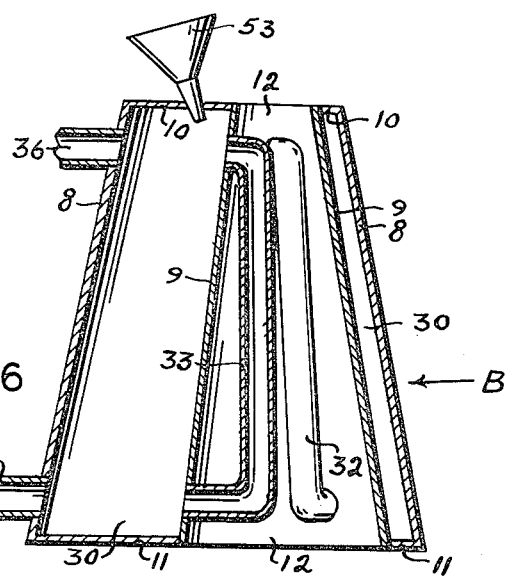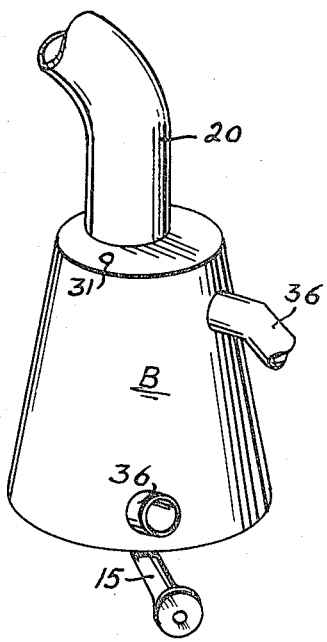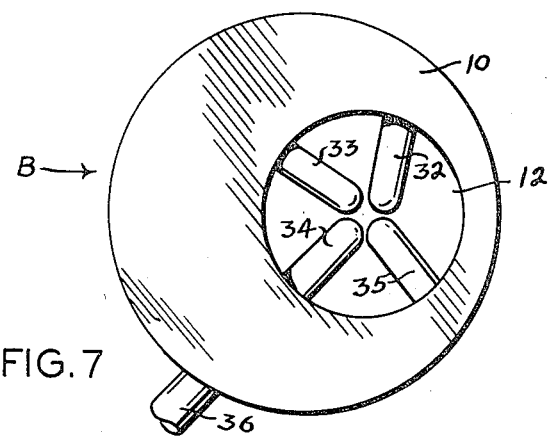

United States Patent Office 2,728,325
Patented Dec. 27, 1955

2,728,325

WATER HEATING APPARATUS FOR WATERING TROUGHS

Frank J. Sturma, Oklahoma City, Okla.

Application January 26, 1953, Serial No. 333,146

4 Claims. (Cl. 119—73)

The present invention relates to apparatus for heating water, and more particularly to apparatus for heating out-door tanks, such as watering troughs for poultry and small animals such as young pigs.

The principal object of the present invention, is to provide water heating apparatus which will automatically maintain drinking water in an out-door tank between predetermined temperature limits, regardless of the atmospheric temperatures therearound.

Another object is to provide a water heating apparatus which, when once properly adjusted, requires a minimum of observation or supervision.

A further object is to provide an apparatus of this class which utilizes the combusted fuel gases to pre-heat the water supply to the drinking tank or trough, thus economizing in the required fuel consumption.

An additional object is to provide an apparatus for the purposes set forth, which utilizes the principle of thermo-syphon in obtaining water circulation between the heating unit and the drinking trough.

Other objects will be apparent from the following description when taken in conjunction with the accompanying three sheets of drawings, wherein:

Figure 1 is a perspective view of the apparatus as it appears when the heating unit housing and the water trough lid are in place;

Figure 4 is an enlarged perspective view of the heating unit, per se;

Figure 5 is an enlarged top view of the heating unit;

Figure 6 is a vertical sectional view taken substantially along the line 6—6 of Fig. 5;

Figure 7 is an enlarged bottom view of the heating unit;

Figure 8 is a fragmentary vertical sectional view through water supply or pre-heating tank; and, Figure 9 is an enlarged horizontal sectional view taken substantially along the line 9—9 of Fig. 8.

Like characters of reference designate like parts in those figures of the drawings in which they occur.

In the drawings:

Figure 2:
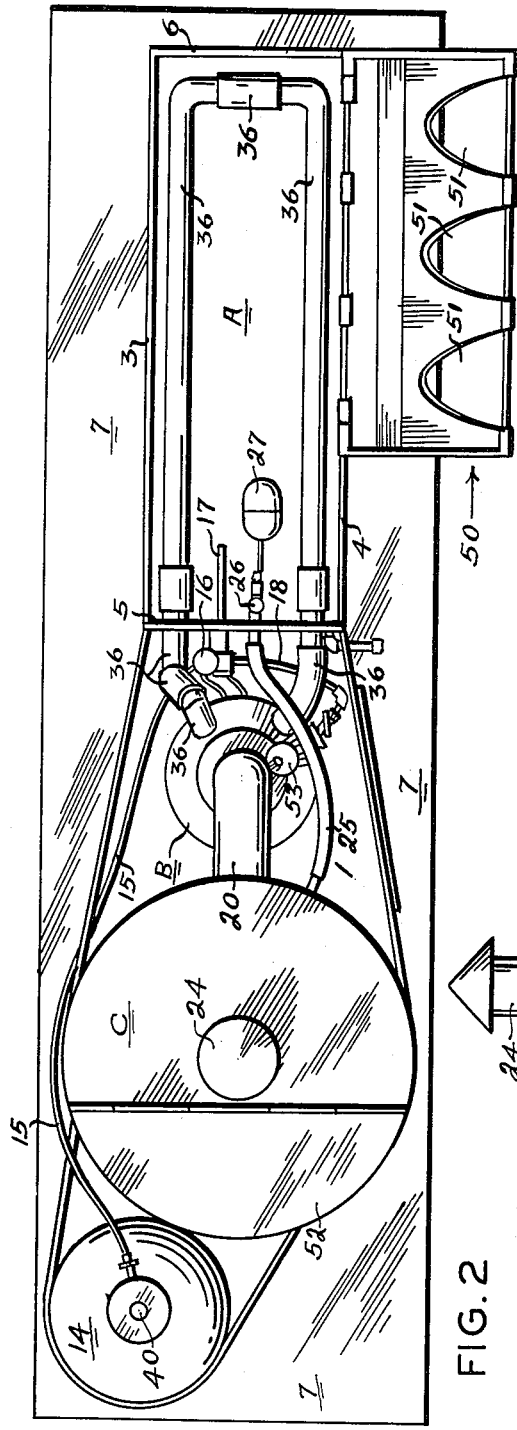
Figure 2 is an enlarged top view when the lid of the heating unit housing is removed, and when the water trough lid is open.

The reference character A indicates, as a whole, an outdoor drinking water vessel or trough for poultry or small animals, said trough or tank preferably being substantially rectangular in form and having a horizontal bottom 2, vertical side walls 3 and 4, vertical end walls 5 and 6, and having its top open. The trough A is preferably mounted on a flat base 7 which may be in the form of a skid for movement along the earth's surface. The trough A is preferably of sheet metal, and conventional in construction.

The device further includes a heating unit B which is mounted upon the base 7 adjacent the end wall 5 of the trough, and also includes a pre-heat supply tank C which is anchored to the base 7 adjacent the heating unit B.

Figure 3:
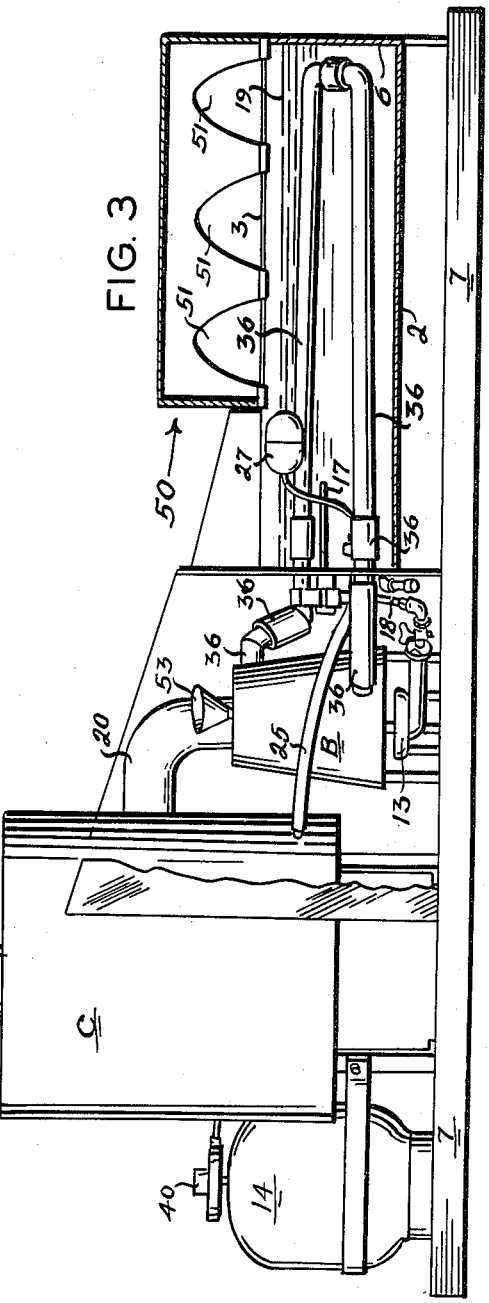
Figure 3 is an enlarged side elevational view with one side of the heating unit housing and with one side of the water trough removed.

The heating unit B includes a conical outer wall 8 of metal and an inner wall 9 spaced from the outer wall eccentrically. The wall 8 might well be termed a jacket. The space between the upper ends of the two walls 8 and 9 is hermetically closed by a top plate 10, and a bottom plate 11 similarly closes the lower end of the space between said walls 8 and 9. The remaining or unclosed portion of the interior of the outer wall 8 is open at the top and bottom, as is best illustrated in Fig. 6 of the drawings, and this open ended portion forms a combustion chamber 12 below which is disposed a conventional burner 13 for fluid fuel. The burner 13 is adapted to receive fluid fuel from a supply source or tank 14 through a conduit or pipe line 15. The line 15, intermediate its ends, is provided with a cut-off valve 16 which is actuated by a conventional thermostat mechanism, which includes a feeler-rod 17 located within the water trough A. A branch fuel line 18 runs from the main fuel line 15 to convey fuel to a conventional pilot light, not shown, but which is positioned adjacent the burner 13. The thermostat and fuel burner arrangement is such that the fuel feed to the burner 13 is automatically controlled by the temperature of a body 19 of water in the trough A (Fig. 3), as is more fully described hereinbelow. Obviously, the pilot light is adapted to ignite fuel exhausted from the burner 13 at any time the cut-off valve 16 is opened by the thermostat mechanism.

The upper end of the combustion chamber 12 receives a flue-pipe 20 which leads to the interior of the supply tank C. The flue-pipe 20 within the tank C opens into a closed chamber 21 having one or more baffles 22 for impeding the outflow of combusted gases, so that additional heat transfer may be had to a body 23 of water in the tank C. A vertical outlet or exhaust pipe 24 leads from the chamber 21 to the outside atmosphere. The exhaust arrangement for combusted gases from the combustion chamber 12 is such that the body 23 of water in the tank C is pre-heated in an obvious manner. A water conveying line 25 leads from the tank C to the trough A, and flow of water through the line 25 is controlled by a cut-off valve 26 actuated by a conventional float 27, so that the water in the trough A is automatically maintained at a substantially constant level. The level of the water in the tank C may be manually controlled in any desired manner, or if desired, a supply line, not shown, may be float-valve controlled to make the water supply automatic.

Referring now more particularly to the heating unit B, the fluid containing space 30, which lies between the outer and inner walls 8 and 9 and which is closed top and bottom by the horizontal plates 10 and 11, is adapted to be filled through an upper opening 31 with some suitable liquid having a low freezing point. This liquid could well be a saline solution, a solution of water and glycerine, or it could well be some other desirable mixture.

A plurality of fluid circulating tubes 32, 33, 34 and 35 lead horizontally through the inner wall 9 into the upper portion of the combustion chamber 12, extend downwardly in the combustion chamber, and then return through the wall 9 into the lower portion of the liquid containing space 30 (Fig. 6). While there are four of such circulating tubes shown in the drawings, any desired plurality thereof could well be provided. The elongated portions of the circulating tubes are exposed directly to the flame of the burner 13, and consequently, any liquid contained therein will be quickly heated by such flame.

The heat applied to the vertical portions of the circulating tubes 32, 33, 34 and 35 within the combustion chamber 12 causes a thermal-syphonic action upon the liquid in the tubes and within the space 30 of the heating unit, and this syphonic action maintains constant circulation of said liquid, as long as the fuel being discharged from the burner 13 is ignited.

A fluid circulating pipe 36 leads from adjacent the upper end of the liquid containing space 30 into the trough A below the normal liquid level therein, said pipe extends along the side wall 3 within the trough A to a point adjacent its end wall 6, then extends horizontally across the trough, and then returns along the side wall 4 and the bottom 2 to re-enter the space 30 at the bottom thereof. The above described syphonic action of the heat in the combustion chamber 12 causes a continuous and positive circulation of the liquid from the upper portion of the space 30, through the circulating pipe 36 beneath the water surface in the trough A, and then back to the lower portion of the space 30.

*Operation*

With the units A, B, C, and with the fuel tank 14 all mounted on the base 7, and with those elements operatively connected by the various conduits, pipes, valves, etc. as above described, the space 30 of the heating unit B is first filled with the liquid of low freezing point. This liquid may well be termed herein as a "water heating liquid." This liquid is actually in the nature of a conventional liquid refrigerant, although it is used for the purpose of heating rather than for cooling the water in the trough A. In filling the space 30, the circulating pipe 36 is likewise filled through gravitation.

The water supply tank C is next filled with cold or cool water, and during this filling process, the water flows through the pipe 25 to fill the trough A to a level at which the float 27 closes the valve 26.

A pressure reducing valve 40 on the fuel tank 14 is opened to deliver fluid fuel to the burner 13 through the line 15 and through the thermostatically controlled cut-off valve 26. If the water being supplied to the tank C and trough A is cooler than the temperature at which the adjustable thermostat is set for opening the line 15 to the burner 13, the opening of the fuel valve 40 will immediately supply the fuel to the burner 13, and the burning pilot light will ignite the fuel as it leaves the burner. As the fire in the combustion chamber 12 heats the "water heating liquid" in the tubes 32, 33, 34 and 35, the water heating liquid will begin to circulate through the tubes, throughout the space 30, and then through the loop of circulating pipe 36. At the same time, the combusted gases will flow from the combustion chamber 12 through the flue-pipe 20 into the closed chamber 21 in the tank C, where its flow will be retarded by the baffle plate 22. The combusted gases will thereafter leave the chamber 21 through the flue 24 and will escape to the outside atmosphere. During its travel through the pipe 20, through the chamber 21, and through the flue 24, the combusted gases will act to pre-heat the water in the tank C. After the water in the tank C has once been pre-heated, the trough A will thereafter be supplied with warm water, at any time the float 27 opens the valve 26.

When circulation of the water liquid through the circulating pipe 36 has raised the temperature of the water in the trough A to a pre-determined degree, the thermostat feeler 17 will cause the valve 26 to be closed, so as to cut off the fuel supply through the line 15 to the burner 13.

In the illustrated embodiment of the apparatus, the unit B and its valves, fittings, etc. are shown as being enclosed in a sheet metal housing D which may be provided for the purpose of protecting the apparatus from the weather. The trough A is illustrated as being provided with a hinged lid 50 having individual openings 51 through which poultry or small animals may reach the body 19 for drinking water in the trough. Such a lid is optional. The water supply tank C is shown as having a hinged lid 52 which is also optional. A conventional funnel 53 may be provided to expedite the introduction of the water heating liquid into the space 30 through the opening 31, if desired.

After the apparatus has once been placed in operation, the drinking water in the trough A will be automatically maintained within the temperature limits for which the thermostat mechanism has been set.

Obviously, it will be necessary for some person to see that water is kept supplied to the tank C, and that the space 30 of the heating unit B be from time to time supplied with the water heating liquid.

Obviously the invention is susceptible to some change or alternation without defeating its practicability, and I therefore do not wish to be confined to the preferred embodiment shown in the drawings and described herein, further than I am limited by the scope of the appended claims.

I claim:

1. In a drinking water heating apparatus for poultry and small animals, the combination with, a water filled drinking water trough, and a burner connected to a fuel supply of: a truncated conical combustion chamber disposed above said burner; a truncated conical jacket spaced around said chamber having an upper and a lower closed end portion connected to said chamber providing a space filled with a low freezing point liquid; a plurality of vertically disposed liquid circulating tubes exposed in said combustion chamber; and a circulating pipe, in communication with, and leading from said upper portion of said liquid filled space into and out of said drinking trough, disposed below the surface of the water therein, said pipe returning to, and communicating with, said lower portion of said liquid filled space, whereby the heat of said burner creates thermal-syphonic circulation of the liquid within said tubes, said space and said circulating pipe thus heating the water contained within the drinking trough.

2. In a drinking water heating apparatus for poultry and small animals, the combination with, a drinking water trough connected to a water supply and having a float operated valve within said trough for maintaining a predetermined water level therein, a burner connected to a fuel supply line and having a thermostatically controlled valve in said fuel line operatively contacting said water in said trough for controlling the flow of said fuel in accordance with the temperature change of said water, of: an open ended truncated conical combustion chamber vertically disposed above said burner; a truncated conical jacket spaced around said chamber having an upper and a lower closed end portion hermetically sealed to the top and bottom of said chamber, providing a space filled with a low freezing point liquid; a plurality of vertically disposed radially spaced liquid circulating tubes exposed in said combustion chamber, communicating with, and leading from said lower portion to said upper portion of said liquid filled space; and a circulating pipe, in communication with, and leading from said upper portion of said liquid filled space into and out of said drinking trough, disposed below the surface of the water therein, said pipe returning to, and communicating with, said lower portion of said liquid filled space, whereby the heat of said burner creates thermal-syphonic circulation of the liquid within said tubes, said space, and said circulating pipe thus heating the water contained within the drinking trough.

3. In a drinking water heating apparatus for poultry and small animals, the combination with, a water supply, a drinking trough connected to said water supply, a float operated valve within said trough to maintain a predetermined water level within said trough, a burner connected to a fuel supply line, a thermostatically operated valve in said fuel line so constructed and so arranged for supplying fuel to the burner in accordance with temperature changes of said water of said trough, of: an open ended truncated conical combustion chamber vertically disposed above said burner; a truncated conical jacket spaced around said chamber having an upper and a lower closed end portion hermetically sealed to the top and bottom of said chamber, providing a space filled with a low freezing point liquid; a plurality of vertically disposed radially spaced liquid circulating tubes exposed in said combustion chamber, communicating with, and leading from said lower portion to said upper portion of said liquid filled space; and a circulating pipe, in communication with, and leading from said upper portion of said liquid filled space into and out of said drinking trough, disposed below the surface of the water therein, said pipe returning to, and communicating with, said lower portion of said liquid filled space whereby the heat of said burner creates thermal-syphonic circulation of the liquid within said tubes, said space, and said circulating pipe thus heating the water contained within the drinking trough.

4. In a drinking water heating apparatus for poultry and small animals, the combination with, a water filled storage tank, a drinking trough connected to said tank, a float operated valve within said trough to maintain a predetermined water level within said trough, a burner connected to a fuel supply, a thermostat operated valve in said fuel line so constructed and so arranged for supplying fuel to the burner in accordance with temperature changes of said water in said trough, an exhaust pipe operatively disposed above said burner for conveying hot gaseous products of combustion in a circuitous path through said supply tank thereby preheating said water in said storage tank, of: an open ended truncated conical combustion chamber vertically disposed above said burner; a truncated conical jacket spaced around said chamber having an upper and a lower closed end portion hermetically sealed to the top and bottom of said chamber, providing a space filled with a low freezing point liquid; a plurality of vertically disposed radially spaced liquid circulating tubes exposed in said combustion chamber, communicating with, and leading from said lower portion to said upper portion of said liquid filled space; and a circulating pipe, in communication with, and leading from said upper portion of said liquid filled space into and out of said drinking trough, disposed below the surface of the water therein, said pipe returning to, and communicating with, said lower portion of said liquid filled space, whereby the heat of said burner creates thermal-syphonic circulation of the liquid within said tubes, said space, and said circulating pipe thus heating the water contained within the drinking trough.

References Cited in the file of this patent

UNITED STATES PATENTS

| Number | Name | Date |
|---|---|---|
| 1,551,862 | Arnett | Sept. 1, 1925 |
| 1,602,606 | Dierks | Oct. 12, 1926 |
| 1,684,997 | Kraft | Sept. 18, 1928 |